(12) United States Patent
Patil et al.

(10) Patent No.: US 12,517,753 B2
(45) Date of Patent: Jan. 6, 2026

(54) SECURITY-POLICY BASED VIRTUAL MACHINE MIGRATION OR CLONING

(71) Applicant: VMware LLC, Palo Alto, CA (US)

(72) Inventors: Rayanagouda Bheemanagouda Patil, Bangalore (IN); Mandar Barve, Pune (IN); Manisha Sameer Gambhir Parekh, Pune (IN)

(73) Assignee: VMware LLC, Palo Alto, CA (US)

( * ) Notice: Subject to any disclaimer, the term of this patent is extended or adjusted under 35 U.S.C. 154(b) by 103 days.

(21) Appl. No.: 18/372,710

(22) Filed: Sep. 26, 2023

(65) Prior Publication Data

US 2025/0103369 A1  Mar. 27, 2025

(51) Int. Cl.
*G06F 9/455* (2018.01)

(52) U.S. Cl.
CPC ........... *G06F 9/45558* (2013.01); *G06F 2009/45562* (2013.01); *G06F 2009/4557* (2013.01); *G06F 2009/45587* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 10,725,885 B1* | 7/2020 | Paraschiv | G06F 11/3433 |
| 2008/0172492 A1* | 7/2008 | Raghunath | H04L 63/20 709/229 |
| 2017/0060627 A1* | 3/2017 | Birkestrand | G06F 9/45558 |

* cited by examiner

*Primary Examiner* — Clayton R Williams
(74) *Attorney, Agent, or Firm* — Quarles & Brady LLP

(57) ABSTRACT

In an example, a method may include maintaining a virtual machine (VM) object storing a security policy of a VM running on a first host computing system. Further, the method may include attaching the VM object to the VM. In response to detecting a trigger event, the method may include identifying a second host computing system that is in compliance with the security policy in the VM object. Furthermore, the method may include executing a management operation to migrate or clone the VM along with the attached VM object from the first host computing system to the second host computing system.

20 Claims, 6 Drawing Sheets

SECURITY-POLICY BASED VIRTUAL MACHINE MIGRATION OR CLONING

TECHNICAL FIELD

The present disclosure relates to computing environments, and more particularly to methods, techniques, and systems for migrating or cloning virtual machines based on security policies in a computing environment.

BACKGROUND

Computer virtualization is a technique that involves encapsulating a representation of a physical computing machine platform into a virtual machine (VM) that is executed under the control of virtualization software running on hardware computing platforms (also referred to herein as "host computing systems" or "servers"). A group of hardware computing platforms may be organized as a cluster to provide hardware resources, such as memory, central processing units (CPUs) and so on, for VMs. A virtual machine can be a software-based abstraction of the physical computer system. Each virtual machine may be configured to execute an operating system (OS), referred to as a guest OS, and applications. Each VM is a complete execution environment, and the server provides a user interface over the network connection so that user inputs and outputs are communicated between the user and the VM. In such clusters, during failover or load balancing, the VMs may be migrated or cloned to a suitable host computing system that supports the VM specifications/requirements.

Figure 1:
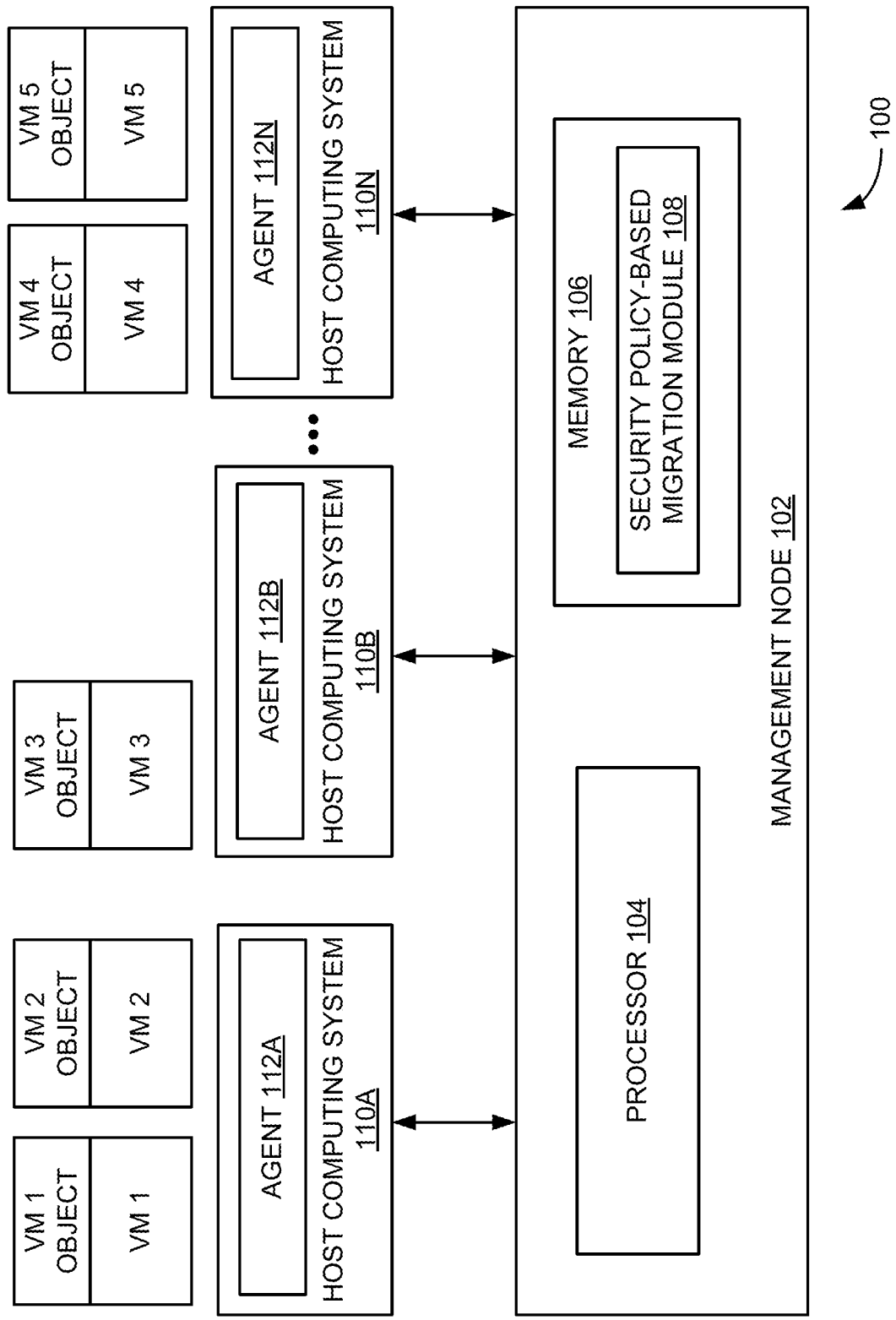
FIG. 1 is a block diagram of an example computing environment, including a security policy-based migration module to migrate or clone a virtual machine (VM) based on a security policy associated with the VM.

The drawings described herein are for illustrative purposes and are not intended to limit the scope of the present subject matter in any way.

DETAILED DESCRIPTION

Examples described herein may provide an enhanced computer-based and/or network-based method, technique, and system to migrate or clone virtual machines (VMs) based on security policies in a computing environment. An overview of the computing environment, existing methods to migrate the VMs in the computing environment, and drawbacks associated with the existing methods.

Computing environment may be a physical computing environment (e.g., an on-premises enterprise computing environment or a physical data center) and/or virtual computing environment (e.g., a cloud computing environment, a virtualized environment, and the like). The virtual computing environment may be a pool or collection of cloud infrastructure resources designed for enterprise needs. The resources may be a processor (e.g., central processing unit (CPU)), memory (e.g., random-access memory (RAM)), storage (e.g., disk space), and networking (e.g., bandwidth). Further, the virtual computing environment may be a virtual representation of the physical data center, complete with servers, storage clusters, and networking components, all of which may reside in virtual space being hosted by one or more physical data centers. Example virtual computing environment may include different endpoints (e.g., physical computers, virtual machines, and/or containers). For example, the computing environment may include multiple application hosts (i.e., physical computers) executing different virtual computing instances (e.g., referred to as workloads) such as virtual machines, containers, and the like running therein. Example endpoints may execute different types of applications.

A group of hardware computing platforms may be organized as a cluster to provide hardware resources, such as memory, central processing units (CPUs) and so on, for VMs. The VMs may operate with their own guest operating systems on a host computing system using resources of the host computing system virtualized by virtualization software (e.g., a hypervisor, virtual machine monitor, and the like). Further, during failover or load balancing in the cluster, VMs may be powered on or migrated to a suitable host computing system that can support the VM specifications/requirements (e.g., hardware, operating system, and the like). In this example, a management node may locate a suitable host computing system where the VM specification is honoured at real time during load balancing, to keep the VM running state with the required hardware devices available.

A distributed resource scheduler™ (DRS) (i.e., a resource scheduling and load balancing solution for virtual computing environments) may work on a cluster of host computing systems and provide resource management capabilities like load balancing and VM placement. In an example, the DRS may provide the load balancing by migrating the VMs from a heavily loaded host computing system to another host computing system that has enough computing resources, all while the VMs are still running. Similarly, during a VM placement, cloning a VM may create a VM that is a copy of the original VM.

As the organizations are moving towards "zero trust security", it may be challenging to keep the VMs secure, particularly, when the security policies of the VMs are not known during the VM migration or cloning. During the load balancing and VM cloning, the DRS may have to ensure that the VM is not migrated to a host computing system where the VM does not have matching security profiles. In existing methods, the DRS may rely on resources such as compute, memory, network, and the like. However, the DRS may not have security visibility, which may create gaps in the security window where the VM goes unprotected during the VM migration.

In such scenarios, when a management plane is in a bad state or communication between the management plane and the VMs are lost during migration, it may be a challenging task to keep the VMs secure with "zero trust security" until the management plane recovers. Similarly, the security of the VM may be a challenge where the hypervisor is getting upgraded or some restoration is happening where the VMs may have to be evacuated to other host computing systems.

Examples described herein may provide a management node to migrate or clone VMs based on security policies. The management node may maintain a VM object storing a security policy of a VM running on a first host computing system. Further, the management node may attach the VM object to the VM. In response to detecting a trigger event, the management node may identify a second host computing system that complies with the security policy in the VM object. Furthermore, the management node may execute a management operation to migrate or clone the VM along with the attached VM object from the first host computing system to the second host computing system. Upon migrating or cloning the VM along with the attached VM object, the management node may retrieve the security policy from the attached VM object and apply at least one security profile that complies with the retrieved security policy to the VM running on the second host computing system Thus, examples described herein may protect the VMs during failover or load balancing as the VM object including the security policy is attached to the VM for security visibility.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Referring now to the figures, FIG. 1 is a block diagram of an example computing environment 100, including a security policy-based migration module 108 to migrate or clone a virtual machine (VM) based on a security policy associated with the VM. Example computing environment 100 may be a cloud computing environment (e.g., a virtualized cloud computing environment), a physical computing environment, or a combination thereof. For example, the cloud computing environment may be enabled by vSphere®, VMware's cloud computing virtualization platform. The cloud computing environment may include one or more computing platforms that support the creation, deployment, and management of virtual machine-based cloud applications or services or programs. An application, also referred to as an application program, may be a computer software package that performs a specific function directly for an end user or, in some cases, for another application. Examples of applications may include MySQL, Tomcat, Apache, word processors, database programs, web browsers, development tools, image editors, communication platforms, and the like.

In an example, computing environment 100 may include a data center having multiple host computing systems (e.g., 110A-110N), each executing corresponding ones of VMs (e.g., VM 1-VM 5). In this example, a host computing system may be a physical computer. The physical computer may be a hardware-based device (e.g., a personal computer, a laptop, or the like) including an operating system (OS). Further, each of host computing systems 110A-110N may include an agent (e.g., 112A-112N) that acts as an intermediate service for communication between a management node 102 and a host computing system (e.g., 110A-110N). In an example, agent 112A-112N may monitor resource (e.g., processor, memory, and the like) availability of respective physical host computing systems and communicate monitored information to management node 102.

An example agent can be a distributed resource scheduler (DRS) agent that acts as an intermediate service for communication between a distributed resource scheduler (DRS) and a host computing system. The DRS may refer to a resource scheduling and load balancing solution for a virtualized environment (e.g., vSphere®). The DRS may work on a cluster of host computing systems 110A-110N and provide resource management capabilities like load balancing and VM placement. In an example, the DRS may provide the load balancing by migrating VMs from a heavily loaded host computing system to another host computing system that has enough computing resources, all while the VMs are still running. Similarly, during a VM placement, cloning a VM may create a VM that is a copy of the original VM.

In some examples, a virtual machine (e.g., VM 1-VM 5) may operate with its own guest OS on a physical host computing system (e.g., 110A-110N) using resources of the physical host computing system (e.g., 110A-110N) virtualized by virtualization software (e.g., a hypervisor, a virtual machine monitor, and the like). Further, each virtual machine (e.g., VM 1-VM 5) may include a corresponding VM object (e.g., VM 1 object-VM 5 object) attached therein. In an example, a VM object (e.g., VM 1 object) may be attached to VM 1. The VM object may store a security policy associated with the VM in an encrypted format. The security policy may include at least one rule/requirement to safeguard the VM.

For example, the security policy to protect a VM (e.g., VM 1) may include antivirus and antimalware solutions designed for virtualized environments. For example, the VM may be secured using a NSX Advanced Threat Protection (i.e., a suite of security solutions offered by VMware), NSX-T (i.e., an endpoint protection offered by VMware), or other third-party security solutions, where a security policy decides a kind of malware or antivirus protection that needs to be provided to the VM.

As shown FIG. 1, computing environment 100 may include management node 102 to execute a management application to monitor and manage host computing systems 110A-110N centrally. The centralized management application may provide a centralized platform for management, operation, resource provisioning, and performance evaluation of virtual machines and host computing systems in a distributed virtual data center. For example, the centralized management application may include multiple management services. An example for the centralized management application may include VMware® vCenter Server™ (VC), which is commercially available from VMware. In another example, the centralized management application may include a distributed resource scheduler™ (DRS), a resource scheduling and load balancing solution offered by VMware.

Further, management node 102 may include a processor 104. Processor 104 may refer to, for example, a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof. Processor 104 may, for example, include single or multiple cores on a chip, multiple cores across multiple chips, multiple cores across multiple devices, or suitable combinations thereof. Processor 104 may be functional to fetch, decode, and execute instructions as described herein. Further, management node 102 includes memory 106 coupled to processor 104. In an example, memory 106 may include security policy-based migration module 108. Furthermore, processor 104 may execute security policy-based migration module 108 stored in memory 106.

During operation, security policy-based migration module 108 may detect a trigger event. In an example, security policy-based migration module 108 may detect the trigger event that is initiated by a user to migrate or clone a VM (e.g., VM 1), that a load of a first host computing system (e.g., host computing system 110A) has exceeded a threshold, or that indicates a failure of first host computing system 110A. In response to detecting the trigger event, security policy-based migration module 108 may retrieve, via a first agent (e.g., agent 112A) running in first host computing system 110A, a security policy of a VM 1 from a VM object (e.g., VM 1 object) attached to VM 1 running on first host computing system 110A.

Further, security policy-based migration module 108 may determine a second host computing system (e.g., host computing system 110B) that complies with the retrieved security policy. Furthermore, security policy-based migration module 108 may execute a management operation to migrate or clone VM 1 along with attached VM 1 object from first host computing system 110A to second host computing system 110B. In an example, migrating VM 1 may refer to moving VM 1 from one host computing system to another host computing system. In another example, cloning VM 1 may create a new VM that is a copy of the original VM 1.

Furthermore, security policy-based migration module 108 may apply, via a second agent (e.g., agent 112B) running in second host computing system 110B, at least one security profile that complies with the security policy in attached VM 1 object to the migrated or cloned VM 1 on second host computing system 110B. An example security profile may refer to a security software or security solution to protect the VMs from malicious files, adware, and other threats.

Upon migrating or cloning VM 1 along with attached VM 1 object, security policy-based migration module 108 may enable second agent 112B to retrieve the security policy from attached VM 1 object. Further, security policy-based migration module 108 may determine the at least one security profile employed in second host computing system 110B that complies with the retrieved security policy. Furthermore, security policy-based migration module 108 may apply the at least one security profile to VM 1 running on second host computing system 110B. In an example, a single security profile employed in second host computing system 110B may comply with the retrieved security policy of VM 1. In another example, a set of security profiles employed in second host computing system 110B together may comply with the retrieved security policy.

In other examples, the security policy of VM 1 may include an affinity rule specifying that VM 1 is to run on a specific host group (e.g., that includes second host computing system 110B) to provide security services. In this example, the affinity rules may allow to define rules to control the placement of VMs within a cluster. For example, if a VM is protected by a specific solution (X) and that solution is not present on a destination host computing system, or if a different solution (Y) is present on the destination host computing system, then the VM will not be moved to that destination host computing system.

Thus, examples described herein may protect the VMs using the attached VM object whenever new VMs are created, migrated, cloned, snapshotted, or the like. Further, since the compute orchestration operates independent of the network orchestration and even if the network orchestration and the management plane are non-functional, a functional compute orchestration plane can continue to avail benefits of security policies applicable to deployed VMs using the attached VM object. Furthermore, examples described herein may be implemented during VM migration or cloning, even when the management plane is being upgraded or during restoration.

In some examples, the functionalities described in FIG. 1, in relation to instructions to implement functions of security policy-based migration module 108 and any additional instructions described herein in relation to the storage medium, may be implemented as engines or modules including any combination of hardware and programming to implement the functionalities of the modules or engines described herein. The functions of security policy-based migration module 108 may also be implemented by respective processors. In examples described herein, each processor may include, for example, one processor or multiple processors included in a single device or distributed across multiple devices.

Further, computing environment 100 illustrated in FIG. 1 is shown purely for purposes of illustration and is not intended to be in any way inclusive or limiting to the embodiments that are described herein. For example, a typical cloud computing environment would include many more virtual computing instances, which may be distributed over multiple hosts and data centers, which might include many other types of devices, such as switches, power supplies, cooling systems, environmental controls, and the like, which are not illustrated herein. It will be apparent to one of ordinary skill in the art that the example shown in FIG. 1 as well as all other figures in this disclosure have been simplified for ease of understanding and are not intended to be exhaustive or limiting to the scope of the idea.

Figure 2:
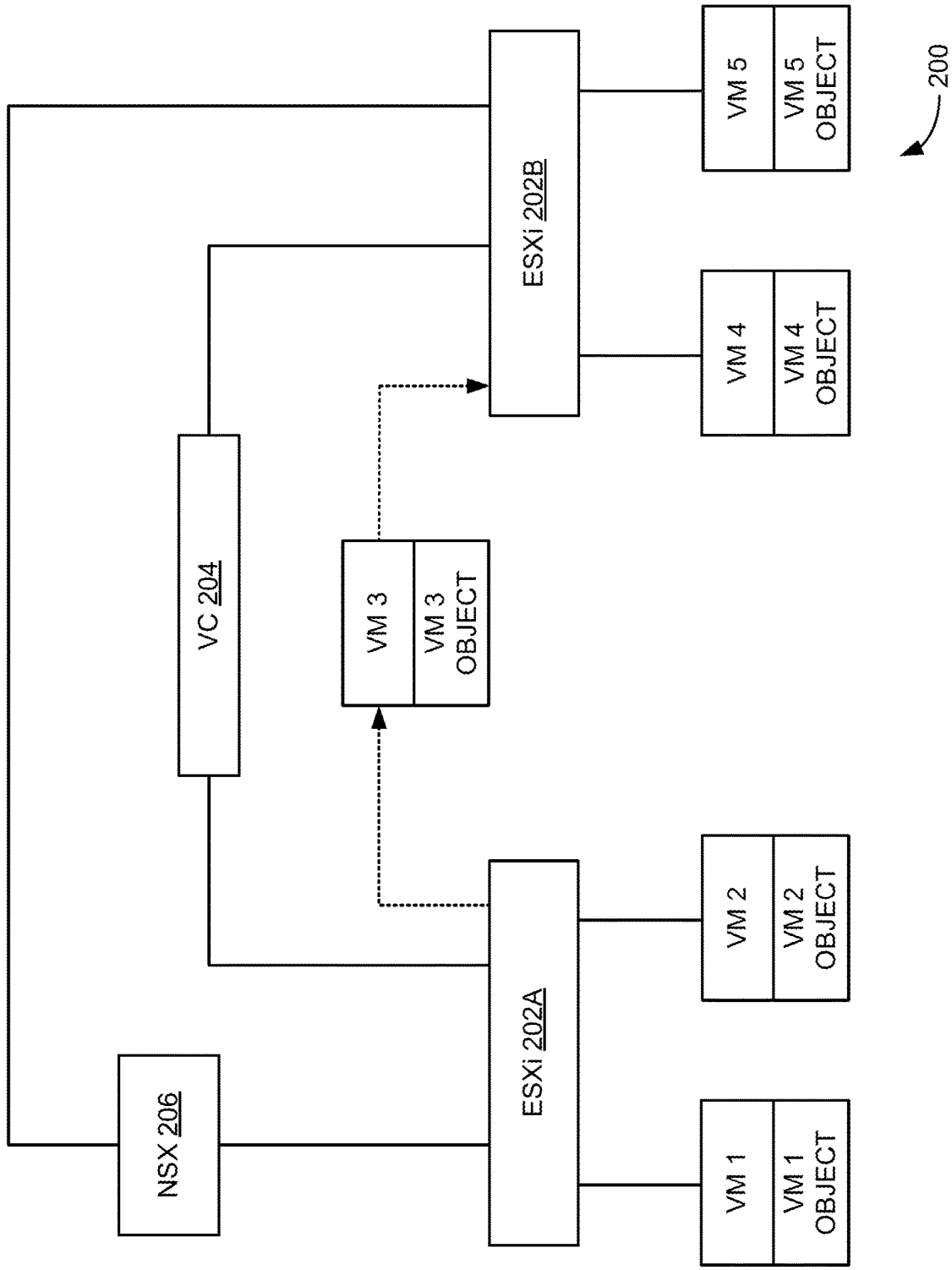
FIG. 2 is a block diagram of another example computing environment, depicting migration of a VM along with an attached VM object from a first host computing system to a second host computing system.

FIG. 2 is a block diagram of another example computing environment 200, depicting migration of a VM (VM 3) along with an attached VM object (VM 3 object) from a first host computing system (e.g., ESXi host 202A) to a second host computing system (e.g., ESXi host 202B). The term "ESX host" refers to a server/data storage device on which an ESXi hypervisor has been installed. The ESXi hypervisor is a bare metal hypervisor that installs on the server and partitions the server into multiple virtual machines. In the example shown in FIG. 2, a host computing system can be an ESXi, which is an enterprise-class, type-1 hypervisor developed by VMware for deploying and serving VMs (e.g., VM 1 to VM 5). Each VM (e.g., VM 1 to VM 5) may include corresponding VM objects attached thereto to store associated security policies.

Further, computing environment 200 may include a centralized management application (e.g., VMware® vCenter Server™ (VC) 204) to migrate or clone VMs in computing environment 200. Furthermore, computing environment 200 may include a network virtualization platform (e.g., NSX controller 206), a Security and Networking service of the Cross-Cloud services portfolio that enables secure networking for computing environment 200.

During operation, VC 204 may receive a user request to manually migrate VM 3 running on ESXi host 202A using a vMotion feature. In response to receiving the user request, VC 204 may retrieve a security policy of VM 3 from a VM 3 object attached to VM 3 running on ESXi host 202A. Further, VC 204 may determine ESXi host 202B that complies with the retrieved security policy from a plurality of ESXi hosts. Further, VC 204 may migrate VM 3 along with attached VM 3 object from ESXi host 202A to ESXi host 202B.

Thus, during vMotion, a compatibility check with a destination host may include a verification of the security/protection policy. For example, during vMotion, existing methods may perform compatibility checks for hosts, network, and storage. Examples described herein may extend the compatibility checks to add the security profile checks.

In the examples described in FIG. 2, the migration can happen with NSX controller 206 or without the NSX controller 206 (i.e., the ESXi hosts operate in a "headless mode"). In this example, since VM 3 object is attached with VM 3, even though NSX controller 206 is failed or network connectivity is lost between VM 3 and NSX controller 206, VM 3 is still be safeguarded as the security policy is known via VM 3 object. Even though FIG. 2 is explained using the vMotion feature, examples described herein can also be applicable for different types of cloning processes, where new VMs are created from templates.

Figure 3:
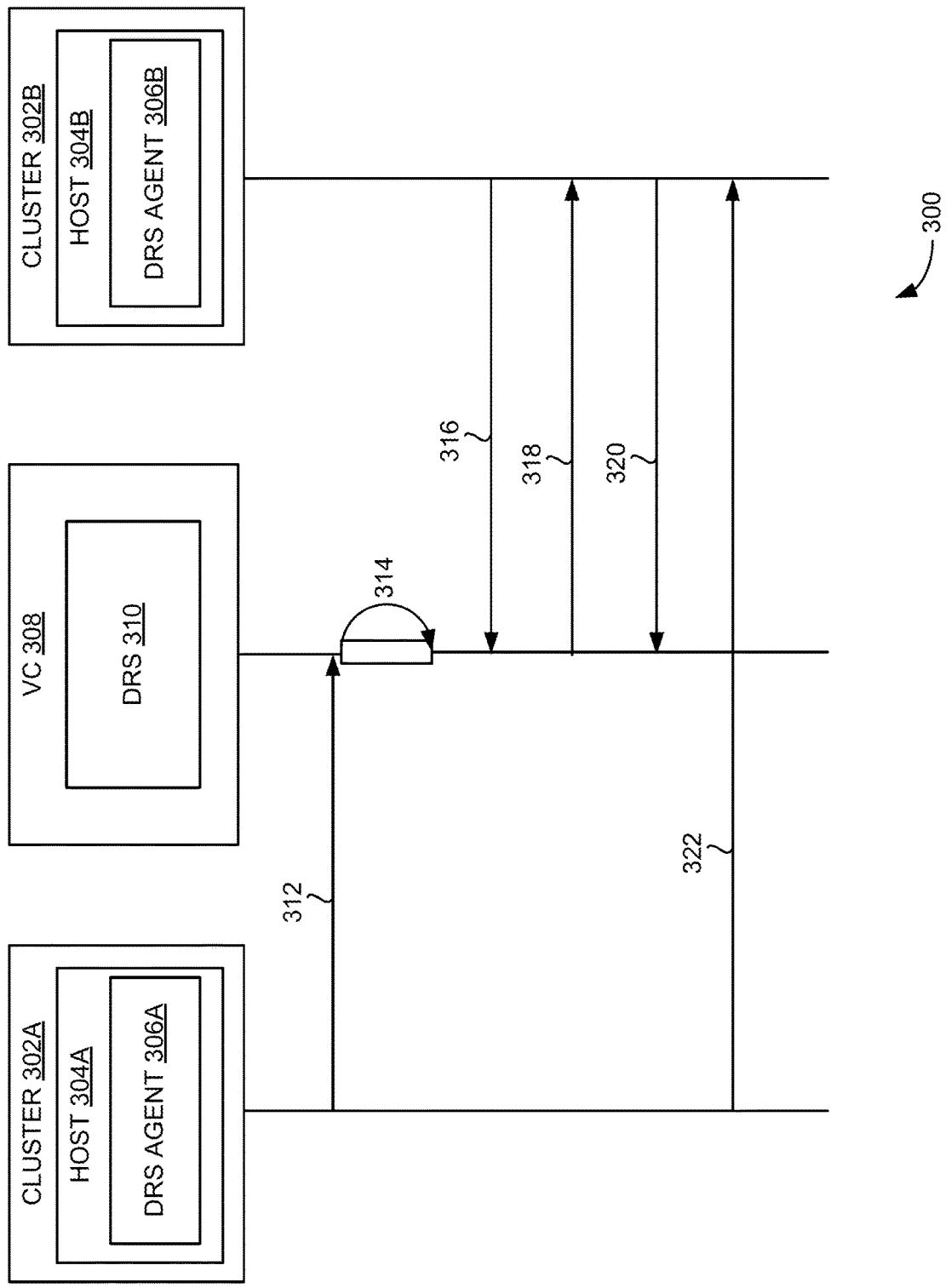
FIG. 3 is an example sequence diagram illustrating a sequence of events to provide load balancing by migrating a VM from a heavily loaded host computing system to another host computing system that complies with a security policy attached to the VM.

FIG. 3 is an example sequence diagram 300 illustrating a sequence of events to provide load balancing by migrating a VM from a heavily loaded host computing system 304A to another host computing system 304B that complies with a security policy attached to the VM. Sequence diagram 300 may represent the interactions and the operations involved in migrating the VM from host computing system 304A to host computing system 304B. FIG. 3 illustrates process objects including DRS agents 306A and 306B, installed on respective host computing systems 304A and 304B, and a DRS 310 in vCenter Server™ (VC) 308 along with their respective vertical lines originating from them. DRS 310 may be a feature in VC 308 that balances VMs across multiple hosts in a cluster based on resource utilization. Further, agents 306A and 306B may act as an intermediate service for communication between DRS 310 and respective one of host computing systems 304A and 304B. The vertical lines of agent DRS agents 306A and 306B, and DRS 310 may represent the processes that may exist simultaneously. The horizontal arrows (e.g., 312, 316, 318, 320, and 322) may represent the data flow steps between the vertical lines originating from their respective process objects (e.g., DRS agents 306A and 306B, and DRS 310). Further, activation box (e.g., 314) between the horizontal arrows may represent the process that is being performed in the respective process object.

In example shown in FIG. 3, host computing system 304A may belong to a cluster 302A and second host computing system 304B may belong to a second cluster 302B. During operation of cluster 302A, VMs' workloads may change. Multiple VMs with changing workloads can create an imbalance in cluster 302A. Because of the imbalance in cluster 302, the performance of applications being executed by the VMs may be negatively affected. In this example, DRS 310 may regularly monitor the cluster balance state at regular intervals (e.g., every five minutes) and then takes the necessary actions to fix any imbalance. For example, DRS 310 may automatically determine which VM would benefit from a move to another host computing system and live migrates the VM onto the new host computing system (e.g., using vMotion). Thus, the DRS 310 may ensure each VM in the cluster gets required resources such as memory, CPU, and the like of the host computing system.

At 312, DRS agent 306A of host computing system 304A may send a message to DRS 310 that host computing system 304A is overloaded. In this example, DRS agent 306A may read a security policy of the VM from a VM object attached to the VM. Further, DRS agent 306A may also retrieve a security profile that is applied to the VM on the host. Then, DRS agent 306A of host computing system 304A may send the message including the retrieved security policy and the retrieved security profile to DRS 310. Upon receiving the message, at 314, a check may be made by DRS 310 to determine whether there is a cluster or sub-cluster with same security policy attached to VC 308 (e.g., whether the security policy of a VM associated with cluster 302A is being supported by any other cluster). In this example, DRS 310 may determine whether the cluster or the sub-cluster with same security policy is available by polling or broadcasting a message to multiple clusters.

At 316, DRS agent 306B of host computing system 304B may respond to DRS 310 that cluster 302B includes an affinity towards the security policy. Upon receiving the confirmation with respect to the affinity towards the security policy, DRS 310 may identify that host computing system 304B has matching security profiles with piggy backed security policy of the VM. DRS 310 may send a notification to DRS agent 306B to check whether host computing system 304B may include resources for performing vMotion, at 318. In response to the notification, at 320, DRS agent 306B may confirm to DRS 310 that the resources are available for vMotion and vMotion can be initiated. Based on the match along with other criteria (i.e., compute, resource, and/or network availability), DRS 310 may make selection of a suitable host computing system (i.e., 304B) for placement. Upon receiving the confirmation, DRS 310 may initiate migration of the VM associated with host computing system 304A to host computing system 304B. In this example, the VM may be migrated from host computing system 304A to host computing system 304B along with a VM object storing security policy of the VM. Upon migrating the VM, at 324, DRS agent 306B on host computing system 304B retrieves the security policy from the attached VM object, determines at least one security profile employed in host computing system 304B that complies with the retrieved security policy, and apply the at least one security profile to the VM running on host computing system 304B.

Figure 4:
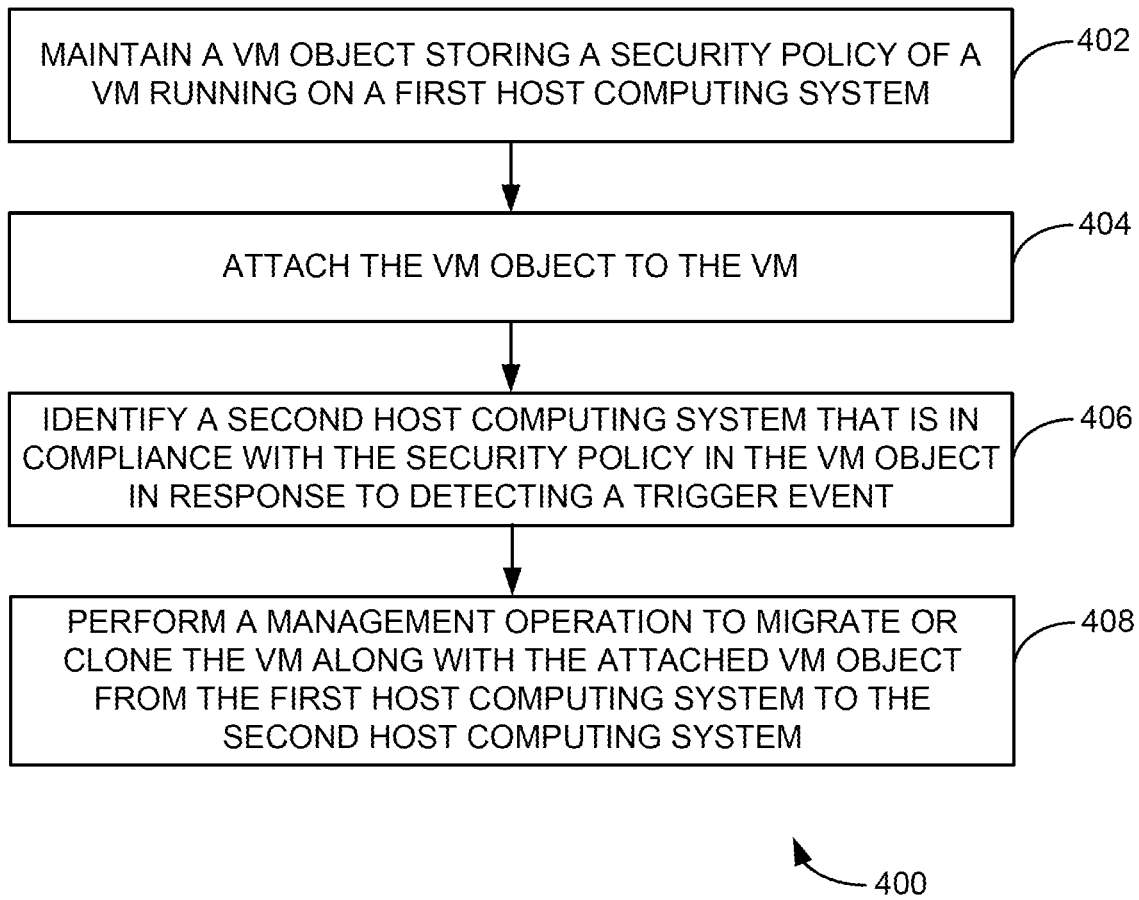
FIG. 4 is a flow diagram illustrating an example method for migrating or cloning a VM based on a security policy.

FIG. 4 is a flow diagram illustrating an example method 400 for migrating or cloning a VM based on a security policy. Example method 400 depicted in FIG. 4 represents generalized illustrations, and other processes may be added, or existing processes may be removed, modified, or rearranged without departing from the scope and spirit of the present application. In addition, method 400 may represent instructions stored on a computer-readable storage medium that, when executed, may cause a processor to respond, to perform actions, to change states, and/or to make decisions. Alternatively, method 400 may represent functions and/or actions performed by functionally equivalent circuits like analog circuits, digital signal processing circuits, application specific integrated circuits (ASICs), or other hardware components associated with the system. Furthermore, the flow chart is not intended to limit the implementation of the present application, but the flow chart illustrates functional information to design/fabricate circuits, generate computer-readable instructions, or use a combination of hardware and computer-readable instructions to perform the illustrated processes.

At 402, a VM object storing a security policy of a VM running on a first host computing system may be maintained. In an example, the VM object may be maintained by storing the security policy of the VM in an encrypted format. Further, the security policy may include at least one rule to safeguard the VM. For example, the security policy of the VM may include an affinity rule specifying that the VM is to run on a specific host group including the second host computing system to provide security services. At 404, the VM object may be attached to the VM.

In response to detecting a trigger event, at 406, a second host computing system that is in compliance with the security policy in the VM object may be identified. In an example, identifying the second host computing system that is in compliance with the security policy may include detecting the trigger event initiated by a user to perform the management operation on the VM. Further, in response to detecting the trigger event, the second host computing system that is in compliance with the security policy may be identified.

In another example, identifying the second host computing system that is in compliance with the security policy may include detecting the trigger event that a load of the first host computing system has exceeded a threshold. Further, in response to detecting the trigger event, the second host computing system that is in compliance with the security policy may be identified.

In yet another example, identifying the second host computing system that is in compliance with the security policy may include detecting the trigger event of failure of the first host computing system. Further, in response to detecting the trigger event, the second host computing system that is in compliance with the security policy may be identified.

At 408, a management operation may be executed to migrate or clone the VM along with the attached VM object from the first host computing system to the second host computing system. Further, upon migrating or cloning the VM along with the attached VM object, method 400 may include retrieving the security policy from the attached VM object, determine at least one security profile employed in the second host computing system that complies with the retrieved security policy, and applying the at least one security profile to the VM running on the second host computing system.

Figure 5:
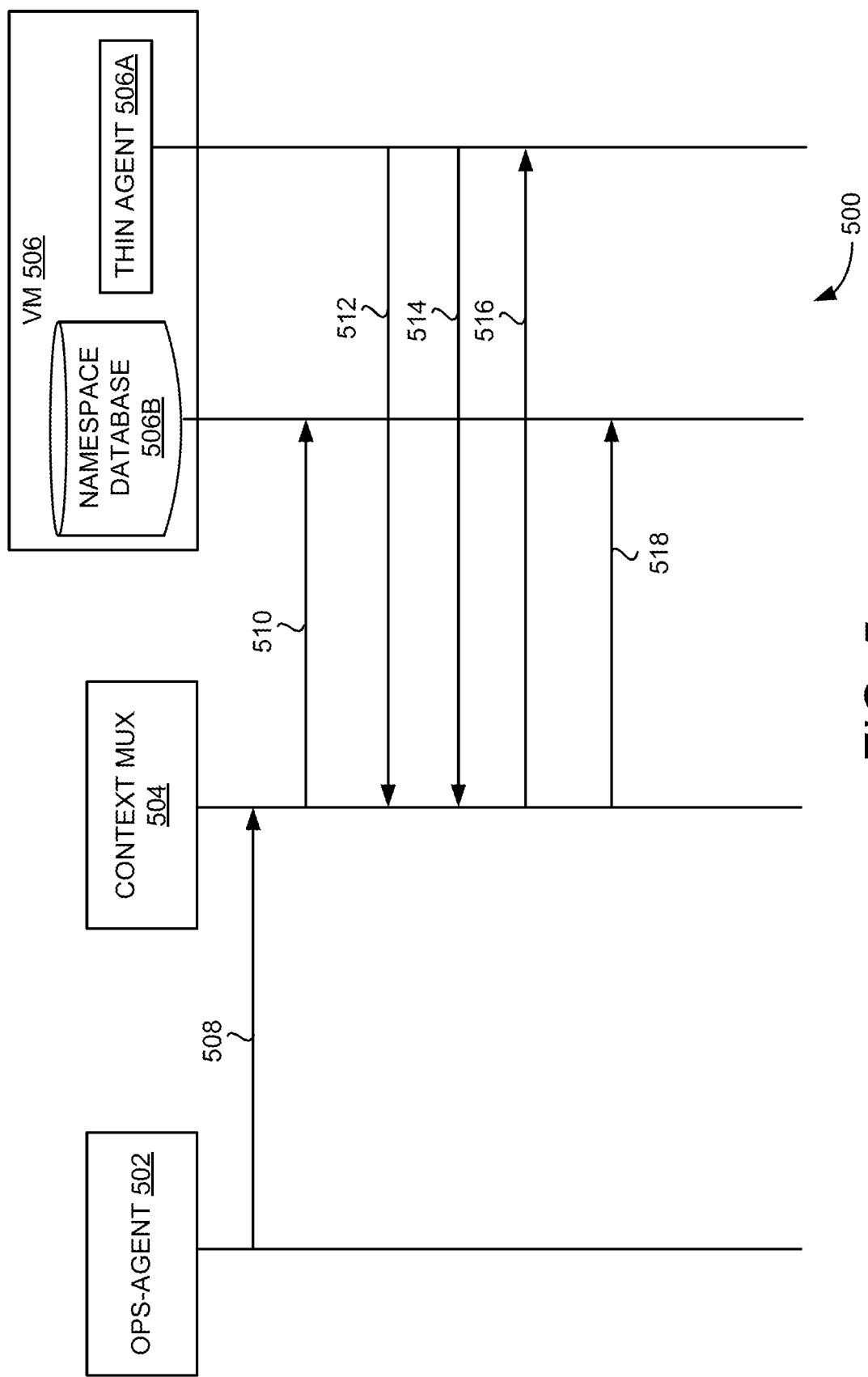
FIG. 5 is a flow chart illustrating an example sequence diagram to protect a VM running on a host computing system using an object attached to the VM.

FIG. 5 is a flow chart illustrating an example sequence diagram 500 to protect a VM 506 running on a host computing system using an object attached to VM 506. Sequence diagram 500 may represent the interactions and the operations involved in including the security policy in the object. FIG. 5 illustrates process objects of the host computing system including an ops-agent 502, a context multiplexer (mux) 504, VM 506, a thin agent 506A deployed in VM 506, and an object (e.g., namespace database or Datasets 506B) attached to VM 506 along with their respective vertical lines originating from them. The vertical lines of ops-agent 502, context mux 504, thin agent 506A, and namespace database or Datasets 506B may represent the processes that may exist simultaneously. The horizontal arrows (e.g., 508, 510, 512, 514, 516, and 518) may represent the data flow steps between the vertical lines originating from their respective process objects (for e.g., ops-agent 502, context mux 504, thin agent 506A, and namespace database or Datasets 506B).

At 508, ops-agent 502 may send configuration message to context mux 504. At 510, context mux 504 may update a security policy (e.g., protection information) in namespace database or Datasets 506B when the security policy of VM 506 is changed. In another example, context mux 504 may create a namespace database or Datasets 506B with the security policy and attach namespace database or Datasets 506B to VM 506 when VM 506 is configured for protection. In an example, the objects, such as a namespace database or Datasets 506B, may include a group of key/value pairs, which may provide infrastructure for sharing information between the VMs and other process objects of the host computing system. For example, the datasets may provide a way to share data between a vSphere Client and a virtual machine guest operating system. A namespace database is a group of resources that consists of datastores, networks (database network), and external storage (local and cloud storage) created by a provider administrator. The namespace database is a logical grouping or subset of the resources that can be used for provisioning a database.

The sequence shown at 508 and 510 may enable to get the security policy from a management plane (e.g., via ops-agent 502) during security configuration and update the security policy in the namespace database or Datasets 506B. Such updating can be performed when VM 506 is configured for protection for the first time or when the security policy is updated.

Further, the sequence shown in 512, 514, 516, and 518 may enable to retrieve a security policy from VM 506. At 512, thin agent 506A deployed in VM 506 may establish a socket connection with context mux 504 running on a host computing system. At 514, thin agent 506A may send a "hello message" to context mux 504 and in response, at 516, "hello reply message" is sent by context mux 504 to thin agent 506A to establish a communication between thin agent 506A and context mux 504.

At 518, MUX 504 may retrieve the security policy from namespace database or Datasets 506B attached to VM 506. In an example, MUX 504 can retrieve the security policy when VM 506 was configured for protection and security policy was stored in the VM's namespace database. After establishing the communication between thin agent 506A and the MUX 504, MUX 504 may retrieve the security policy from namespace database or Datasets 506B attached to VM 506, thereby ensuring continued protection of VM 506 even in the absence of a management node that manages VM 506.

Examples described herein may provide the security information stored in objects such as namespace database/datasets. These objects may be encrypted and are externally attached to the VM. Further, the objects may store security information which persists even if the VM crashes. In an example scenario where the VM migrates from one host computing system to another, the VM may carry the security information, which may protect the VM, its protection level, and the like. Furthermore, the migration can happen with an NSX controller or without the NSX controller (i.e., the host computing system operates in a "headless mode"). Similarly, the security information in the object may be used for placing new VMs, which are created from templates by different types of cloning.

Figure 6:
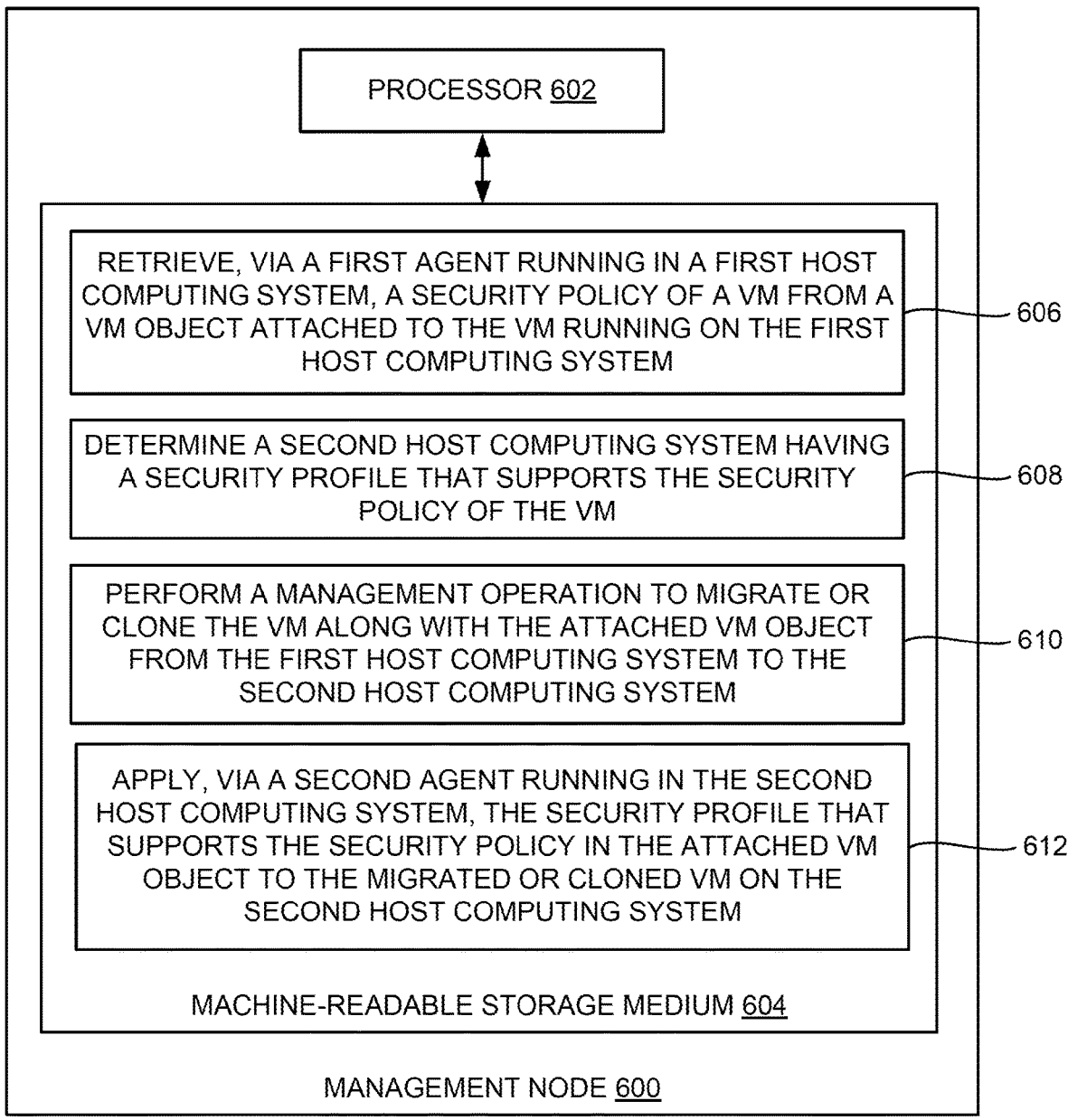
FIG. 6 is a block diagram of an example management node including non-transitory computer-readable storage medium storing instructions to migrate or clone a virtual machine (VM) based on a security policy.

FIG. 6 is a block diagram of an example management node 600 including non-transitory computer-readable storage medium 604 storing instructions to migrate or clone a virtual machine (VM) based on a security policy. Management node 600 may include a processor 602 and computer-readable storage medium 604 communicatively coupled through a system bus. Processor 602 may be any type of central processing unit (CPU), microprocessor, or processing logic that interprets and executes computer-readable instructions stored in computer-readable storage medium 604. Computer-readable storage medium 604 may be a random-access memory (RAM) or another type of dynamic storage device that may store information and computer-readable instructions that may be executed by processor 602. For example, computer-readable storage medium 604 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, computer-readable storage medium 604 may be a non-transitory computer-readable medium. In an example, computer-readable storage medium 604 may be remote but accessible to management node 600.

Computer-readable storage medium 604 may store instructions 606, 608, 610, and 612. Instructions 606 may be executed by processor 602 to retrieve, via a first agent running in a first host computing system, a security policy of a VM from a VM object attached to the VM running on the first host computing system. In an example, the security policy of the VM may include an affinity rule specifying that the VM is to run on a specific host group including the second host computing system to provide security services.

Instructions 608 may be executed by processor 602 to determine a second host computing system having a security profile that supports the security policy of the VM. Instructions 610 may be executed by processor 602 to perform a management operation to migrate or clone the VM along with the attached VM object from the first host computing system to the second host computing system.

In an example, instructions 610 to may include instructions to perform the management operation may include instructions to detect a trigger event. For example, instructions to detect the trigger event may include instructions to detect the trigger event that is initiated by a user, that a load of the first host computing system has exceeded a threshold, or that indicates a failure of the first host computing system. Further, in response to detecting the trigger event, instructions 610 to may include instructions to perform a management operation to migrate or clone the VM along with the attached VM object from the first host computing system to the second host computing system in response to detecting the trigger event.

In an example, instructions 610 to perform the management operation may include instructions to perform the management operation to migrate the VM along with the attached VM object from the first host computing system to the second host computing system in response to detecting a trigger event to migrate the VM. In another example, instructions 610 to perform the management operation may include instructions to perform the management operation to clone the VM along with the attached VM object from the first host computing system to the second host computing system in response to detecting a trigger event to deploy the VM.

Further, instructions 612 may be executed by processor 602 to apply, via a second agent running in the second host computing system, the security profile that supports the security policy in the attached VM object to the migrated or cloned VM on the second host computing system.

In an example, instructions 612 to apply the security profile to the VM may include instructions to upon migrating or cloning the VM along with the attached VM object, read, via the second agent, the security policy from the attached VM object, determine the security profile employed in the second host computing system that supports the retrieved security policy, and apply the security profile to the VM running on the second host computing system.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not be meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A method comprising:
  maintaining a virtual machine (VM) object storing a security policy of a VM running on a first host computing system;
  attaching the VM object to the VM;
  in response to detecting a trigger event, identifying a second host computing system that is in compliance with the security policy in the VM object; and
  executing a management operation to migrate or clone the VM along with the attached VM object from the first host computing system to the second host computing system.

2. The method of claim 1, further comprising:
  upon migrating or cloning the VM along with the attached VM object, retrieving the security policy from the attached VM object;
  determine at least one security profile employed in the second host computing system that complies with the retrieved security policy; and
  applying the at least one security profile to the VM running on the second host computing system.

3. The method of claim 1, wherein the security policy comprises at least one rule to safeguard the VM.

4. The method of claim 1, wherein identifying the second host computing system that is in compliance with the security policy comprises:
  detecting the trigger event initiated by a user to perform the management operation on the VM; and
  in response to detecting the trigger event, identifying the second host computing system that is in compliance with the security policy.

5. The method of claim 1, wherein identifying the second host computing system that is in compliance with the security policy comprises:
  detecting the trigger event that a load of the first host computing system has exceeded a threshold; and
  in response to detecting the trigger event, identifying the second host computing system that is in compliance with the security policy.

6. The method of claim 1, wherein identifying the second host computing system that is in compliance with the security policy comprises:
  detecting the trigger event of failure of the first host computing system; and in response to detecting the trigger event, identifying the second host computing system that is in compliance with the security policy.

7. The method of claim 1, wherein the VM object is maintained by storing the security policy of the VM in an encrypted format.

8. The method of claim 1, wherein the security policy of the VM comprises an affinity rule specifying that the VM is to run on a specific host group including the second host computing system to provide security services.

9. A management node comprising:
a processor; and
memory coupled to the processor, wherein the memory comprises a security policy-based migration module to:
in response to detecting a trigger event, retrieve, via a first agent running in a first host computing system, a security policy of a virtual machine (VM) from a VM object attached to the VM running on the first host computing system;
determine a second host computing system that complies with the security policy;
execute a management operation to migrate or clone the VM along with the attached VM object from the first host computing system to the second host computing system; and
apply, via a second agent running in the second host computing system, at least one security profile that complies with the security policy in the attached VM object to the migrated or cloned VM on the second host computing system.

10. The management node of claim 9, wherein the security policy-based migration module is to enable the second agent to:
upon migrating or cloning the VM along with the attached VM object, retrieve the security policy from the attached VM object;
determine the at least one security profile employed in the second host computing system that complies with the retrieved security policy; and
apply the at least one security profile to the VM running on the second host computing system.

11. The management node of claim 9, wherein the security policy comprises at least one rule to safeguard the VM.

12. The management node of claim 9, wherein the security policy-based migration module is to:
detect the trigger event that is initiated by a user, that a load of the first host computing system has exceeded a threshold, or that indicates a failure of the first host computing system.

13. The management node of claim 9, wherein the security policy-based migration module is to:
generate and maintain the VM object by storing the security policy of the VM in an encrypted format.

14. The management node of claim 9, wherein the security policy of the VM comprises an affinity rule specifying that the VM is to run on a specific host group including the second host computing system to provide security services.

15. A non-transitory computer readable storage medium comprising instructions executable by a processor of a management node to:
retrieve, via a first agent running in a first host computing system, a security policy of a virtual machine (VM) from a VM object attached to the VM running on the first host computing system;
determine a second host computing system having a security profile that supports the security policy of the VM;
execute a management operation to migrate or clone the VM along with the attached VM object from the first host computing system to the second host computing system; and
apply, via a second agent running in the second host computing system, the security profile that supports the security policy in the attached VM object to the migrated or cloned VM on the second host computing system.

16. The non-transitory computer readable storage medium of claim 15, wherein instructions to execute the management operation comprise instructions to:
detect a trigger event; and
in response to detecting the trigger event, execute the management operation to migrate or clone the VM along with the attached VM object from the first host computing system to the second host computing system.

17. The non-transitory computer readable storage medium of claim 16, wherein instructions to detect the trigger event comprise instructions to:
detect the trigger event that is initiated by a user, that a load of the first host computing system has exceeded a threshold, or that indicates a failure of the first host computing system.

18. The non-transitory computer readable storage medium of claim 15, wherein instructions to execute the management operation comprise instructions to:
in response to detecting a trigger event to migrate the VM, execute the management operation to migrate the VM along with the attached VM object from the first host computing system to the second host computing system; or
in response to detecting a trigger event to deploy the VM, execute the management operation to clone the VM along with the attached VM object from the first host computing system to the second host computing system.

19. The non-transitory computer readable storage medium of claim 15, wherein instructions to apply the security profile to the VM comprise instructions to:
upon migrating or cloning the VM along with the attached VM object, retrieve, via the second agent, the security policy from the attached VM object;
determine the security profile employed in the second host computing system that supports the retrieved security policy; and
apply the security profile to the VM running on the second host computing system.

20. The non-transitory computer readable storage medium of claim 15, wherein the security policy of the VM comprises an affinity rule specifying that the VM is to run on a specific host group including the second host computing system to provide security services.

* * * * *